United States Patent [19]

Sueshige et al.

[11] Patent Number: 4,944,142
[45] Date of Patent: Jul. 31, 1990

[54] POWER LAWNMOWER CONSTRUCTION

[75] Inventors: Hiroshi Sueshige; Akitsugu Inokawa, both of Powell; William Bezilla, Marysville, all of Ohio

[73] Assignee: Honda Giken Kogyo Kabushiki Kaisha, Tokyo, Japan

[21] Appl. No.: 234,857

[22] Filed: Aug. 22, 1988

[51] Int. Cl.$^5$ .............................................. A01D 34/67
[52] U.S. Cl. .................................... 56/320.1; 56/13.4; 56/17.5
[58] Field of Search ..................... 56/17.5, 255, 320.1, 56/320.2, 295, 13.3, 13.4, 16.7, 17.1, DIG. 20; 123/41.7, 198 E, 195 C; 181/204, 205

[56] References Cited

U.S. PATENT DOCUMENTS

| | | | |
|---|---|---|---|
| 2,882,668 | 4/1959 | Murillo | 56/12.8 |
| 3,044,241 | 7/1962 | Snider | 56/295 |
| 3,049,854 | 8/1962 | Denney | 56/295 X |
| 3,091,906 | 6/1963 | Hall | 56/295 X |
| 3,178,872 | 4/1965 | Swindler | 56/13.4 |
| 3,298,163 | 1/1967 | Ottosen et al. | 56/10.3 |
| 3,468,108 | 9/1969 | Mattson | 56/13.4 |
| 3,500,620 | 3/1970 | Duran et al. | 56/12.8 |
| 3,583,138 | 6/1971 | Mattson | 56/202 |
| 3,641,749 | 2/1972 | Dwyer et al. | 56/17.5 |
| 4,245,455 | 1/1981 | Martin | 56/17.5 X |
| 4,276,737 | 7/1981 | Henning | 56/12.8 |
| 4,527,380 | 7/1985 | Fushiya et al. | 56/12.8 |
| 4,731,981 | 3/1988 | Geringer | 56/17.5 |

FOREIGN PATENT DOCUMENTS

| | | | |
|---|---|---|---|
| 3232895 | 3/1984 | Fed. Rep. of Germany | 56/320.1 |
| 61-98430 | 1/1984 | Japan . | |
| 2140663 | 12/1984 | United Kingdom | 56/255 |

Primary Examiner—Stephen J. Novosad
Assistant Examiner—David J. Bagnell
Attorney, Agent, or Firm—Lyon & Lyon

[57] ABSTRACT

A power lawnmower having a body, a motor mounted to the body with a vertical drive shaft, a cover over the motor defining a power source chamber and a cutter blade below the body. Located on the drive shaft below the motor is a fan enclosed within a cylinder having openings therethrough. An opening in the cover admits air in to the motor chamber through an air filter. Two rows of ribs extending downwardly from the cover provide a filter cavity for receipt of the air filter in this opening. A second filter is positioned atop the motor and compressed between the motor and the cover. This air filter is retained by positioning ribs extending downwardly from the cover to the motor. An attachment mechanism mounting the blade to the drive shaft incorporates an attachment plate to which the blade is attached, a socket receiving the end of the drive shaft and two collars. A first collar is located within the socket and abuts against the end of the drive shaft. A second collar abuts against the end of the socket and is positioned about the drive shaft. A fastener extends through the socket to attach to a fastening bore in the end of the drive shaft.

36 Claims, 2 Drawing Sheets

POWER LAWNMOWER CONSTRUCTION

BACKGROUND OF THE INVENTION

The field of the present invention is power lawnmowers. Power lawnmowers have long been employed for the cutting of grass and other similar functions. Such lawnmowers often employ engines or electric motors. The environment in which such mowers operate often involves a substantial amount of dust, dirt and clippings which must be considered in the design of such systems. Mowers are also expected to be relatively maintenance free and of simple construction. Substantial adjustment is also advantageous to allow for use over different terrains and vegetation.

The foregoing requirements have often been difficult to achieve without compromise. For example, complicated structures to handle and exclude dust, dirt, cuttings and the like can detract from reliability, increase cost, increase weight and potentially reduce the effectiveness of other features. Consequently designs of such systems have typically been a compromise in an effort to satisfy competing requirements.

SUMMARY OF THE INVENTION

The present invention is directed to improved lawnmower designs. In a first aspect of the present invention, cooling air flow for the power source is advantageously controlled in association with the structure of the mower. In one feature, a fan is advantageously positioned below the power source to draw cooling air therethrough. A central cavity is provided for the fan by the configuration of the cutter scroll while providing outlet for the cooling air and structural protection for the fan. In another feature, the power source is found to be located within a closed cavity advantageously employing an air inlet covered by an air filter between the body and the cover. In another feature, filter material directly at the inlets to the power source are conveniently positioned by the mower cover in a simple, uncomplicated manner. In yet another feature, a spring plate mounting system is employed to create an appropriate mounting for the power source and at the same time augment the closure of the cavity in which the power source is located. Finally, a mechanism for allowing maximum adjustment of the cutter blade and yet retain high shaft strength characteristics is presented.

Accordingly, there are several elements and features contributing to an improved power lawnmower design. Other and further objects and advantages will appear hereinafter.

DETAILED DESCRIPTION OF THE PREFERRED EMBODIMENTS

Figure 1:
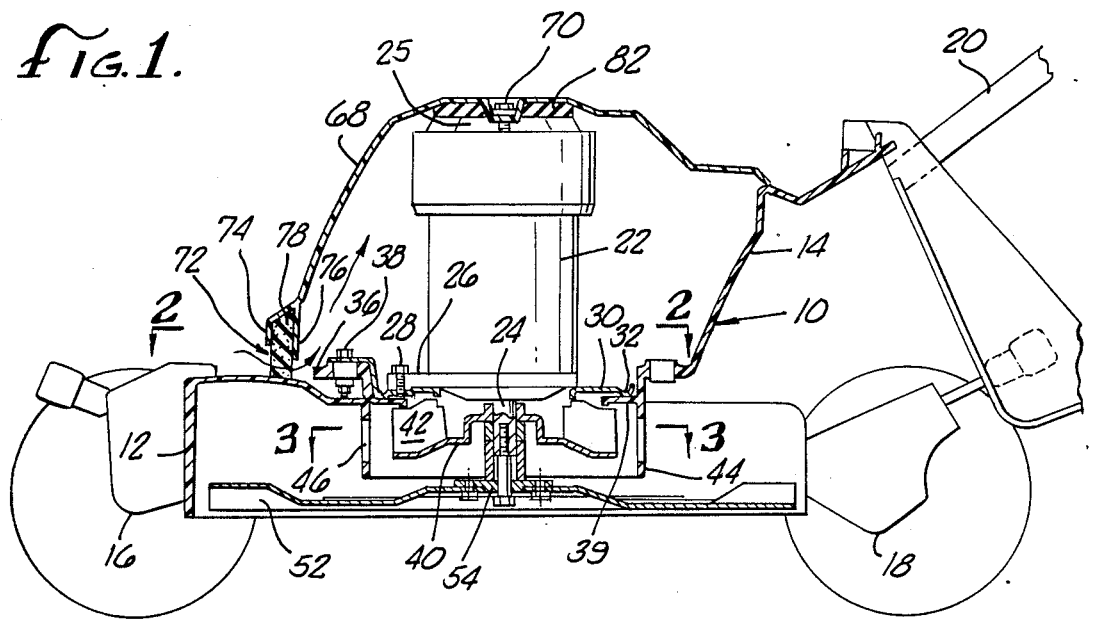
FIG. 1 is a cross-sectional elevation of a first embodiment of the present invention.

Turning in detail to the drawings, FIG. 1 illustrates a power lawnmower having a main body, generally designated 10. The body 10 defines a plurality of structural support and cavity formation sections. The body 10 includes a cutter cavity structure 12 defining a cutter scroll. A power chamber structure 14 is also defined by the body 10. Adjustable wheel mounting systems 16 and 18 are supported by the body as is a handle 20.

Arranged in association with the body 10 is a power source 22. The power source illustrated in the preferred embodiment is a motor 22 which is vertically mounted with a drive shaft 24 extending vertically downwardly from the motor 22. The motor 22 has conventional air cooling passages 25 extending therethrough with inlets at the upper end of the motor and outlets at the lower end of the motor adjacent to the drive shaft. The drive shaft 24 is conveniently of the type employing a central fastening bore, typically threaded, extending axially along the shaft 24 from its outer end. The motor includes a mounting plate 26 rigidly fixed to the body of the motor 22. The mounting plate 26 is roughly triangular in shape and is formed to accommodate fasteners at the three corners thereof. In this instance, holes are provided in the mounting plate 26 for bolts 28.

To mount the motor 22 to the body 10, a spring plate 30 is associated with the mounting plate 26. The spring plate 30 includes a circular corrugation 32 at the outer edge of the spring plate 30. The corrugation 3 is downwardly extending to define a contact surface for resting the spring plate 30 on the body 10. Extending outwardly from the circular corrugation 32 are three mounting flanges 34 which cooperate with mounting bosses 36 by means of bolts 38 to fixedly retain the spring plate 30 in place on the body 10. An inwardly extending mounting flange 39 of the body 10 provides a surface upon which the circular corrugation 32 may rest. Extending inwardly from the circular corrugation 32 is the main body of the spring plate 30 which spans the distance between the mounting flange 34 and the underside of the mounting plate 26 of the motor 22. Thus, a spring mounted motor is achieved while effecting closure of the body 10 between the power source chamber above the body structure 14 and the cutter cavity within the structure 12. Thus, a combined resident mounting and barrier is provided such that water and grass clippings cannot move through this area into the motor housing.

Attached to the drive shaft 24 of the motor 22 is a centrifugal fan 40 having radial flow blades 42 with a central inlet defined inwardly of the blades. When the shaft 24 is rotated, a low pressure area is developed on the inlet side of the fan with air flowing radially outwardly induced by the motion of the blades.

Figure 4:
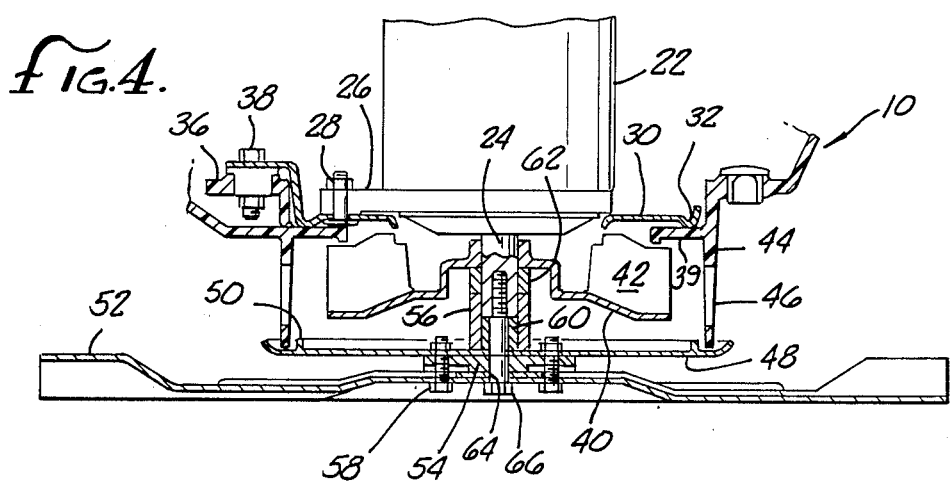
FIG. 4 shows an alternate embodiment in crosssectional elevation.

Concentrically arranged around the fan 40 is a cylinder 44 forming an inner wall of the cutter scroll. Penetrating the cylinder 44 are openings 46 which are preferably in the form of vertical slots. The vertical slots 46 are located radially outwardly of the fan 40 such that air flow induced by the fan 40 may move without significant impedance into the cutter scroll and from the mower. The cavity defined by the cylinder 44 in which the fan 40 is located may further be closed by the employment of a cover plate 48 that is secured to the blade 52 for rotation therewith. The cover plate 48, as best seen in FIG. 4, is thus located below the fan 40 and extends radially outwardly from a central mounting associated with the shaft 24 in closely spaced relation to the cylinder 44. A labyrinth seal may be provided by cooperation between the cover plate 48 and the cylinder 44 in which an upwardly extending flange 50 from the surface of the cover plate, which flange is conveniently circular and axially overlaps the downwardly extending cylinder 44. The outer edges of the cover plate 48 may be upturned to further establish the labyrinth seal.

The mower includes at the bottom of the cutter cavity a cutter blade 52. The cutter blade 52 is mounted to a blade attachment plate 54. Associated with the blade attachment plate 54 is a socket 56. The socket 56 is designed to receive the end of the drive shaft 24 of the motor 22. With the socket 56 and the attachment plate 54 being structurally united, the drive shaft 24 is associated with the cutter blade 52 through mounting bolts 58. To provide extension to the blade attachment, a first collar 60 is located within the socket 56. A second collar 62 abuts against the end of the socket 56 and is positioned about the drive shaft 24. A hole 64 is presented in the blade 52 and the attachment plate 54 to receive a fastener 66 that extends into the central fastening bore on the drive shaft 24. The fastener 66 is shown to be a bolt threaded at one end and having a head at the other to prevent extraction of the cutter blade 52. The shank of the bolt 66 fits within the collar 60 positioned within the socket 56. Thus, a structurally stable, elongated attachment is presented. Changing the collars 60 and 62 can effect different ground clearance for the blade.

Mounted to the chamber structure 14 of the body 10 is a cover 68. The cover 68 extends at its periphery to the body 10 to enclose the power source chamber located above the body 10. The cover may be fastened to the body by means of a fastener 70 which attaches to the upper end of the motor 22. The cover 68 may be of any convenient shape of sufficient size to enclose the motor 22 and meet the body 10 about the periphery of the cover 68. Provided in one portion of the periphery of the cover 68 is an opening generally designated 72. The opening 72 is located at the forward end of the cover 68 and extends between the cover 68 and a portion of the housing 10. The opening 72 includes a first row of ribs 74 which are downwardly extending and mutually spaced apart. Thus, substantial open area is presented between the ribs. The ribs 74 of this row also do not extend fully to the body 10 when the cover 68 is in place. A second row of ribs 76 also extends downwardly from the cover 68. The ribs 76 of this second row are also mutually spaced apart to provide for open area therebetween and do not fully reach the body 10. Created by the rows of ribs 74 and 76 is a filter cavity into which an air filter 78 is positioned. The air filter 78 does extend to the body 10 such that the cover 68, the body 10 and the rows of ribs 74 and 76 define the filter cavity to retain the air filter 78. The row of ribs 74 is found to be shorter than the row of ribs 76 such that the air filter may be more easily replaced. At the same time, the air filter is less likely to be ingested into the chamber. The placement and compression of the air filter can also act as a damper for vibration of the cover.

Figure 2:
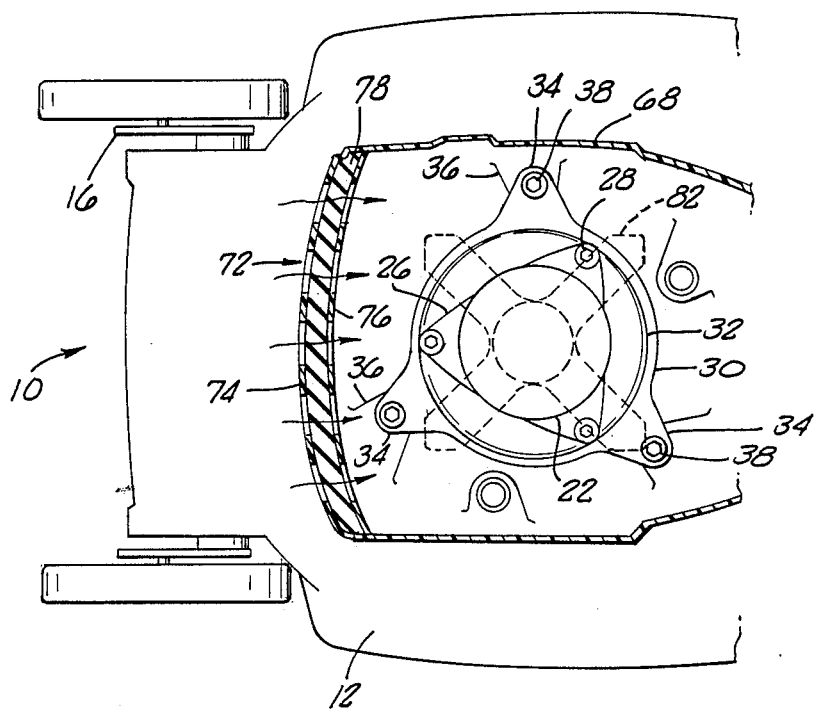
FIG. 2 is a partial plan view in cross section taken along line 2—2 of FIG. 1.
Figure 3:
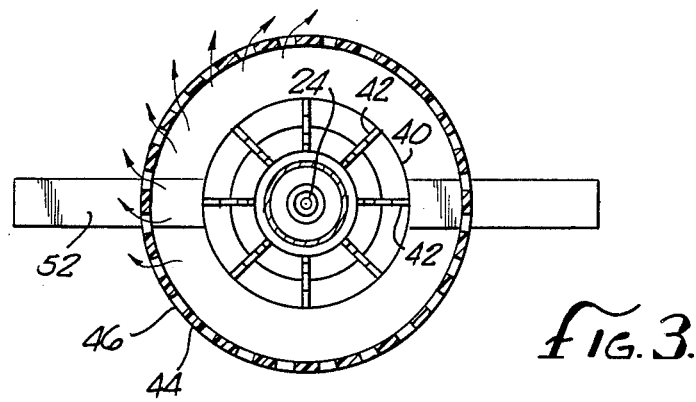
FIG. 3 is a cross-sectional plan view taken along line 3—3 of FIG. 1.
Figure 5:
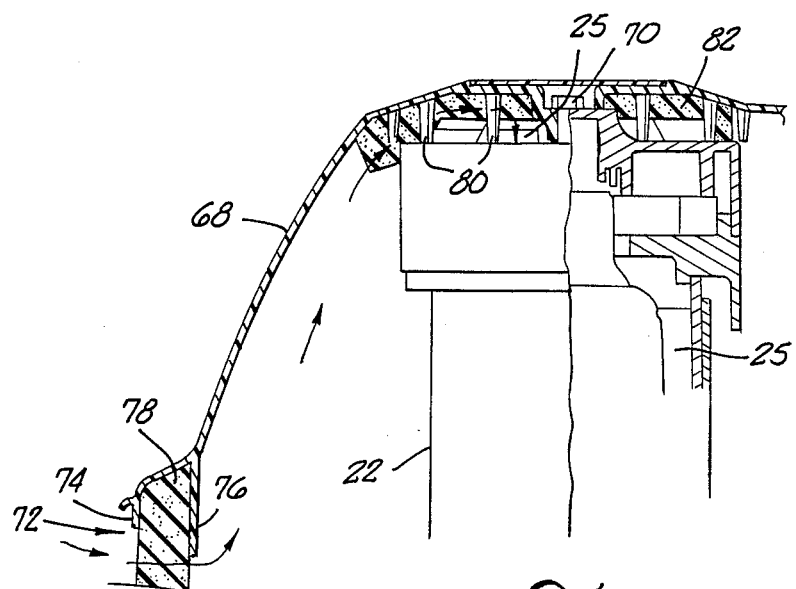
FIG. 5 illustrates an additional feature in crosssectional elevation.

Located on the inner side of the upper portion of the cover 68 are positioning ribs 80. The positioning ribs 80, as best seen in FIG. 5, extend downwardly to the top of the motor 22. Thus, the cover 68 is stabilized against the top of the motor by the ribs 80 and the fastener 70. Between the ribs 80 and compressed between the top of the motor 22 and the cover 68 is an air filter 82. The air filter 82 is best illustrated in FIG. 5 and shown in phantom in FIG. 2. The air filter 82 has a generally cruciform shape and is designed to cover the inlets to the motor.

Looking to the operation of the mower, the operation of the motor 22 results in the rotation of the cutter 52. Also, rotation of the fan 40 is caused by running of the motor 22. The fan 40 draws air through the air cooling passages within the motor and ejects that air outwardly through the slots 46 for discharge from the mower. Because the cover 68 substantially closes the power source chamber above the body 10, air is drawn into the chamber through the opening 72. This air is filtered by the air filter 78. The air then flows upwardly to the air filter 82 where it is further filtered prior to passing through the motor 22. The arrangement of the mounting by means of the spring plate 30 also act to partially close the chamber. The cylinder 44 about the fan 40 allows free flow of exhausted air from the cooling system and at the same time provides protection for the fan 40 from hard objects which may be picked up by the blades 42 as well as grass and dirt.

Thus, an improved power lawnmower is provided. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A lawnmower comprising:
   a body;
   a power source mounted to said body;
   a vertical drive shaft extending downwardly from said power source;
   a cutter mounted to said shaft;
   a fan mounted to said shaft between said power source and said cutter, said fan having radial flow fan blades defining a central inlet inwardly of said blades and directly below said power source;
   a cutter scroll mounted to said body, said scroll including a cylinder wall concentrically disposed about said shaft outwardly of said fan and having its lower edge located above said cutter, and
   a plurality of openings positioned directly radially outwardly of said fan extending through said cylindrical wall.

2. The lawnmower of claim 1 wherein said power source is a motor.

3. The lawnmower of claim 1 wherein said fan is a centrifugal fan.

4. The lawnmower of claim 1 wherein said openings are vertical slits.

5. The lawnmower of claim 1 further comprising a cover plate mounted to said shaft and extending outwardly to said cylinder wall below said fan.

6. The lawnmower of claim 5 wherein said plate extends beyond said cylinder wall and includes a labyrinth seal with the free end of said cylinder wall.

7. The lawnmower of claim 6 wherein said labyrinth seal has an upwardly extending circular flange inwardly of said cylinder wall to axially overlap said cylinder.

8. The lawnmower of claim 1 wherein said power source is a motor having air cooling passages therethrough with outlets at the lower end of said motor, the inlet side of said fan being directly below said outlets, said fan being centrifugal.

9. A lawnmower comprising
   a body;
   a power source mounted on said body;

a cover positioned on said body and extending at the periphery thereof to said body to define a chamber above said body;

an opening in said cover about a portion of the periphery thereof;

an air filter positioned in said opening and extending in vibration damping relation between said cover and said body.

10. The lawnmower of claim 9 wherein said opening faces forward.

11. The lawnmower of claim 9 further comprising a first row of vertically extending and mutually spaced ribs positioned across said opening.

12. The lawnmower of claim 11 wherein said ribs of said first row extend downwardly from said cover and are spaced from said body.

13. The lawnmower of claim 12 further comprising a second row of vertically extending and mutually spaced ribs positioned across said opening and displaced inwardly from said first row of ribs.

14. The lawnmower of claim 13 wherein said first row of ribs, said second row of ribs, the periphery of said opening in said cover and said body define a filter cavity, said air filter being in said filter cavity.

15. The lawnmower of claim 13 wherein said ribs of said second row of ribs are longer than said ribs of said first row of ribs.

16. The lawnmower of claim 9 wherein said power source is a motor having air cooling passages therethrough with inlets at the upper end of said motor and outlets at the lower end of said motor.

17. The lawnmower of claim 16 further comprising a fan mounted to said motor and having the inlet side at said outlets, said chamber being substantially closed but for said opening and said air cooling passages.

18. A lawnmower comprising a body having a central opening with an inwardly extending mounting flange;

a spring plate having a peripheral corrugation extending downwardly to rest on said mounting flange;

a motor mounted to said spring plate inwardly of said corrugation.

19. The lawnmower of claim 18 wherein said spring plate is fixed to said body outwardly of said corrugation.

20. The lawnmower of claim 18 wherein said spring plate extends to close said central opening between said mounting flange and said motor.

21. The lawnmower of claim 20 further comprising a cover positioned on said body and extending at the periphery thereof to said body to define a chamber above said body, said motor being in said chamber;

an opening in said cover about a portion of the periphery thereof;

air cooling passages extending through said motor with inlets at the upper end of said motor and outlets at the lower end of said motor, said chamber being substantially closed but for said opening and said passages.

22. The lawnmower of claim 20 further comprising air cooling passages extending through said motor with inlets above said spring plate and outlets inwardly of said spring plate in communication with the area below said spring plate.

23. The lawnmower of claim 22 further comprising a fan mounted to said motor below said spring plate and having the inlet side at said outlets.

24. The lawnmower of claim 23 further comprising a cutter scroll mounted to said body and including a cylinder concentrically mounted about said shaft outwardly of said fan, said cylinder including openings therethrough.

25. The lawnmower of claim 24 wherein said openings are vertical slits.

26. The lawnmower of claim 25 wherein said fan includes radial flow fan blades defining a central fan inlet inwardly of said blades, said inlet being directly below said motor.

27. The lawnmower of claim 26 wherein said openings are directly radially outward of said fan.

28. A lawnmower comprising a body;

a cover separably attached to said body;

a motor positioned on said body within said cover and having air cooling inlets;

a plurality of positioning ribs integrally formed on said cover and extending inwardly from said cover to rest against said motor;

an air filter positioned among said ribs and between said cover and said motor to cover said air inlets.

29. The lawnmower of claim 28 wherein said air filter is compressed between said cover and said motor.

30. The lawnmower of claim 28 wherein said cover extends at the periphery thereof to said body to define a chamber above said body and includes an opening about a portion of the periphery thereof; and further comprising a second air filter positioned in said opening between said cover and said body.

31. The lawnmower of claim 30 wherein said motor has air cooling passages therein with said air inlets at the upper end of said motor and outlets at the lower end of said motor.

32. The lawnmower of claim 31 wherein said chamber is substantially closed but for said opening and said air cooling passages in said motor.

33. The lawnmower of claim 37 further comprising a fan mounted to and driven by said motor, said fan having the inlet side thereof at said air cooling passage outlets.

34. The lawnmower of claim 33 further comprising a cutter scroll mounted to said body, said scroll including a cylinder concentrically mounted about said fan and including openings therethrough, said fan being centrifugal.

35. The lawnmower of claim 34 further comprising a cover plate extending outwardly to said cylinder below said fan.

36. The lawnmower of claim 28 wherein said motor has air cooling passages therein with said air inlets at the upper end of said motor and outlets at the lower end of said motor; further comprising a fan mounted to and driven by said motor, said fan having the inlet side thereof at said air cooling passage outlets; and a cutter scroll mounted to said body, said scroll including a cylinder concentrically mounted about said fan and including openings therethrough, said fan being centrifugal.

* * * * *

UNITED STATES PATENT AND TRADEMARK OFFICE
CERTIFICATE OF CORRECTION

PATENT NO. : 4,944,142

DATED : July 31, 1990

INVENTOR(S) : H. Sueshige et al.

It is certified that error appears in the above-identified patent and that said Letters Patent is hereby corrected as shown below:

In claim 33 (column 6, line 42) delete "37" and insert therefor -- 32 --.

Signed and Sealed this

Twenty-eighth Day of April, 1992

Attest:

HARRY F. MANBECK, JR.

*Attesting Officer*  *Commissioner of Patents and Trademarks*